M. C. RANDOL.
Corn-Planter.

No. 196,387.  Patented Oct. 23, 1877.

WITNESSES:
A. W. Almquist
J. H. Scarborough

INVENTOR:
M. C. Randol
BY Munn & Co.
ATTORNEYS.

UNITED STATES PATENT OFFICE.

MASTIN C. RANDOL, OF HUNTINGDON, TENNESSEE.

IMPROVEMENT IN CORN-PLANTERS.

Specification forming part of Letters Patent No. 196,387, dated October 23, 1877; application filed July 13, 1877.

*To all whom it may concern:*

Figure 1:
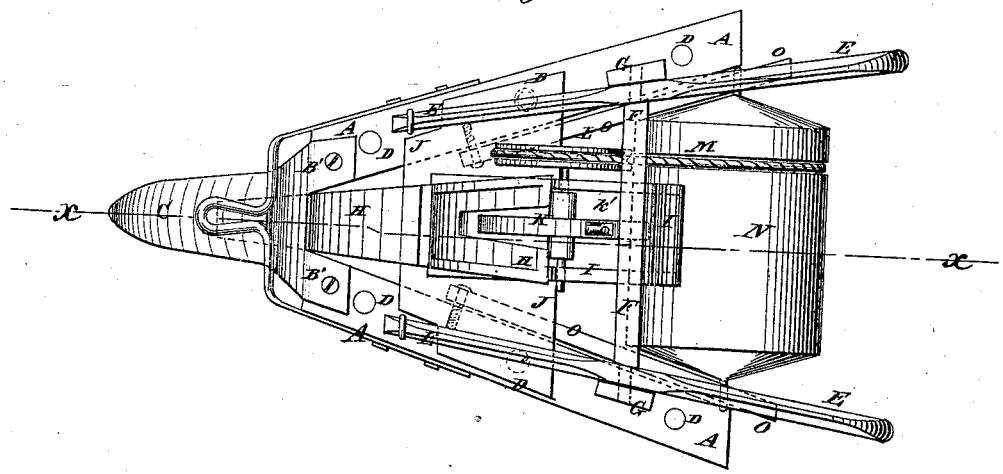
Figure 2:
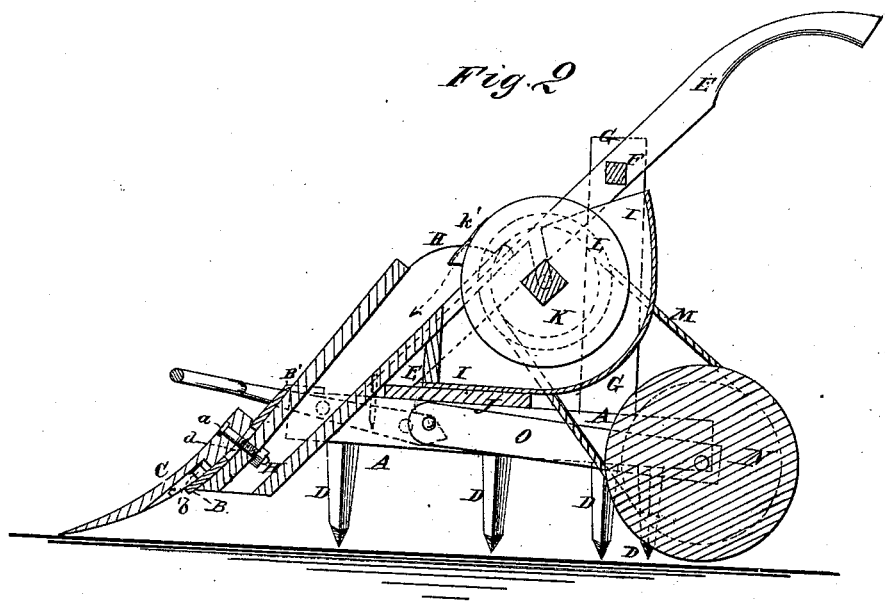

Be it known that I, MASTIN CRAWFORD RANDOL, of Huntingdon, county of Carroll, and State of Tennessee, have invented a new and useful Improvement in Corn-Planters, of which the following is a specification:

Figure 1 is a top view of my improved corn-planter. Fig. 2 is a vertical longitudinal section of the same, taken through the line $x\,x$, Fig. 1.

Similar letters of reference indicate corresponding parts.

The object of this invention is to furnish an improved machine for planting corn and other seeds, which may be adjusted to plant the seeds at any desired distance apart and any desired amount in a hill, which will open a furrow, drop the seed, cultivate the soil upon both sides of the furrow, cover the seed, and roll the soil, and which shall be simple in construction and convenient in use.

The invention consists in the construction and combination of devices, which will be hereinafter more fully described, and then pointed out in the claim.

In the drawing, A is the base or tooth frame, which is formed of two inclined bars, firmly connected together at their forward ends by a metal plate, B, consisting of a downwardly-projecting portion and upper horizontal branches B' B', attached to the beams of the frame. Said downwardly-projecting portion of the plate forms a seat or support for a plow-plate, C, to open a furrow to receive the seed. Said plow-plate has a groove, C, on its under side to receive a headed lug, $b$, on the plate B, to prevent the lateral displacement of the plow, and permit it to be adjusted vertically. A screw-bolt, $a$, passes through the plow C, plate B, and spout H, and serves to secure said plow and spout to the supporting-plate. A slot, $d$, is made in the latter to permit the necessary vertical adjustment to be given to the plow and spout. To the inclined bars A are attached harrow or cultivator teeth D, to loosen up and cultivate the soil upon both sides of the furrow. E are the handles, the lower ends of which are attached to the upper side of the forward part of the bars A, and their upper parts are connected by a cross-bar, F. The ends of the cross-bar F are attached to the upper ends of the uprights G, the lower ends of which are attached to the rear part of the bars A. H is the spout by which the seed is conducted into the furrow opened by the plow C, close in the rear of said plow.

The seed-box I is made narrow, and is attached to a board, J, attached to the bars A. The bottom and the rear side of the seed-box I are concaved to correspond with the arc of the dropping-wheel K. The journals of the dropping-wheel K revolve in bearings in the sides of the seed-box I, and to the face of said wheel are attached one or more cups, $k'$, which take the seed from the seed-box I and drop it into the spout H. The forward part of the dropping-wheel K passes through a slot in the upper part of the rear side of the spout H. One of the journals of the dropping-wheel K projects, and to it is attached a pulley, L, around which passes a band, M, which also passes around the roller N, or around a pulley attached to the end of said roller. The roller N is pivoted to the rear ends of two bars, O, which pass forward along the inner sides of the inclined bars A, and are pivoted to the forward parts of said bars A. To the forward parts of the outer sides of the bars A are attached the end parts of an iron bar, P, upon the middle part of which is formed a loop for the attachment of the draft. The distance apart of the hills is regulated by the number of cups $k'$ attached to the dropping-wheel K, and the number of kernels dropped at a time is regulated by the size of the cups $k'$. The face of the roller N may be concaved, if it is not desired to press the soil down so closely upon the seed.

Having thus fully described my invention, I claim as new and desire to secure by Letters Patent—

The combination of the vertical plate B, having horizontal top branches B', with the beams A, plow C, spout H, and bolt $a$, as and for the purpose set forth.

MASTIN CRAWFORD RANDOL.

Witnesses:
 JAMES A. GRIZZARD,
 W. L. MCNEILL.